United States Patent [19]

Hall et al.

[11] Patent Number: 5,295,397
[45] Date of Patent: Mar. 22, 1994

[54] SLOTTED ORIFICE FLOWMETER

[75] Inventors: Kenneth R. Hall; Gerald L. Morrison, both of College Station; James C. Holste, Bryan, all of Tex.

[73] Assignee: The Texas A & M University System, College Station, Tex.

[21] Appl. No.: 729,934

[22] Filed: Jul. 15, 1991

[51] Int. Cl.⁵ .......................... G01F 1/42; G01F 15/02
[52] U.S. Cl. .............................. 73/861.02; 73/861.61; 137/44
[58] Field of Search ........... 73/861.02, 861.03, 861.52, 73/861.61, 861.62; 138/44

[56] References Cited

U.S. PATENT DOCUMENTS

| | | | |
|---|---|---|---|
| 2,687,645 | 8/1954 | Velten et al. | 73/861.61 |
| 3,750,710 | 8/1973 | Hayner | 138/44 X |
| 3,838,598 | 10/1974 | Tompkins | 73/861.52 |
| 4,015,473 | 4/1977 | Kleuters et al. | 73/861.52 |
| 4,040,293 | 8/1977 | Wilson | 73/861.61 |
| 4,562,744 | 1/1986 | Hall et al. | |
| 4,592,390 | 6/1986 | Boyd | 138/44 X |
| 4,841,781 | 6/1989 | Khalifa | 73/198 |

*Primary Examiner*—Herbert Goldstein
*Attorney, Agent, or Firm*—Baker & Botts

[57] ABSTRACT

A flow impedance device is provided for an obstruction flowmeter for determining the flow rate of a compressible or incompressible fluid in a conduit. The flowmeter has means for measuring the temperature and pressure of the fluid as well as the pressure differential across the flow impedance device, and further means for computing a flow rate from the measured pressures. The flow impedance device includes a plate having a plurality of elongated openings arranged in a predetermined pattern. The plate is installed generally transversely in the conduit to force the fluid to flow through the plurality of elongated openings.

30 Claims, 1 Drawing Sheet

SLOTTED ORIFICE FLOWMETER

TECHNICAL FIELD OF THE INVENTION

This invention relates in general to the field of flow measurement instrumentation. More particularly, the present invention relates to a slotted orifice flowmeter for measuring the flow rate of a compressible or incompressible fluid.

BACKGROUND OF THE INVENTION

Flowmeters are presently dominated by designs using the orifice as the flow impedance device. Obstruction flowmeters of this type typically use a baffle plate having a circular opening installed transversely in the conduit. The fluid is forced to flow through the orifice, creating a pressure drop across the plate. The differential pressure is then measured across the orifice, which, along with stream pressure and temperature, are used to compute the flow rate with formulas as known in the art. Alternatively, the flow rate may be computed more accurately by also measuring the temperature differential across the orifice. One such flow rate measuring device is described in U.S. Pat. No. 4,562,744, issued to Hall et al., incorporated herein by reference.

Although the design and construction of a single orifice is simple, its accuracy is highly sensitive to upstream and downstream flow conditions. Consequently, devices commonly called flow conditioners or straighteners are required to eliminate any swirling or other flow field disturbances in the fluid flow upstream of the orifice. In addition, long straight meter runs are required upstream of the flowmeter to reduce unfavorable flow conditions which may affect the accuracy of the flowmeter as well as straight runs downstream.

Another drawback in introducing the normal orifice in the path of fluid flow is that the progression of the fluid is significantly disrupted. While it is desirable to minimize the area of the orifice, the unrecoverable pressure drop across the orifice becomes great. Also a significant distance is required downstream for pressure recovery.

Therefore, it is desirable to provide a flow impedance device for a flowmeter which overcomes the disadvantages associated with the standard single orifice design. More specifically, it is desirable to eliminate the requirement of flow conditioning or to provide the effect of flow conditioning without using conventional flow conditioners or straighteners. Additionally, it is advantageous to provide a reduced unrecoverable pressure drop across the flow impedance device without sacrificing the accuracy of the resulting flow rate measurement. It is also desirable to provide apparatus adaptable to measure the flow rate of both homogeneous and non-homogeneous fluids.

SUMMARY OF THE INVENTION

In accordance with the present invention, a slotted orifice flowmeter is provided which substantially eliminates or reduces disadvantages and problems associated with prior flow rate measurement devices.

In one aspect of the present invention, a flow impedance device is provided for a flowmeter for determining the flow rate of a fluid in a conduit. The flowmeter has means for measuring the pressure and temperature of the fluid as well as the pressure differential across the flow impedance device, and further means for computing a flow rate from the measurements. The flow impedance device includes a plate having a plurality of elongated openings arranged in a predetermined pattern. The plate is installed generally transversely in the conduit to force the fluid to flow through the plurality of elongated openings.

In another aspect of the present invention, a method is provided for measuring the flow rate of a fluid in a conduit. A flow impedance is created in the conduit by forcing the fluid to flow through a plurality of narrow openings distributed uniformly across the cross-sectional area of the conduit, and the pressure and temperature of the fluid as well as the pressure differential across the flow impedance are measured. The flow rate is then computed from the measurements.

A primary technical advantage of the present invention provides a flow impedance device that can be used to upgrade existing obstruction flowmeters to obtain more accurate measurements. The upgrading effort may merely include replacing the existing flow impedance device with the slotted orifice while preserving and reusing the remaining flowmeter parts.

Another important technical advantage of the present invention provides for flow rate measurement the accuracy of which is relatively insensitive to upstream and downstream flow conditions.

Yet another important technical advantage of the present invention is the less disruptive manner which is used to impede the fluid flow. Therefore, fluid pressure, for example, recovers more readily and within a shorter distance from the flowmeter, and incurs less unrecoverable pressure drop than a conventional orifice.

Further advantages of the present invention may be appreciated upon examining the specification and claims below.

BRIEF DESCRIPTION OF THE DRAWINGS

For a better understanding of the present invention, reference may be made to the accompanying drawings, in which.

DETAILED DESCRIPTION OF THE INVENTION

Figure 1:
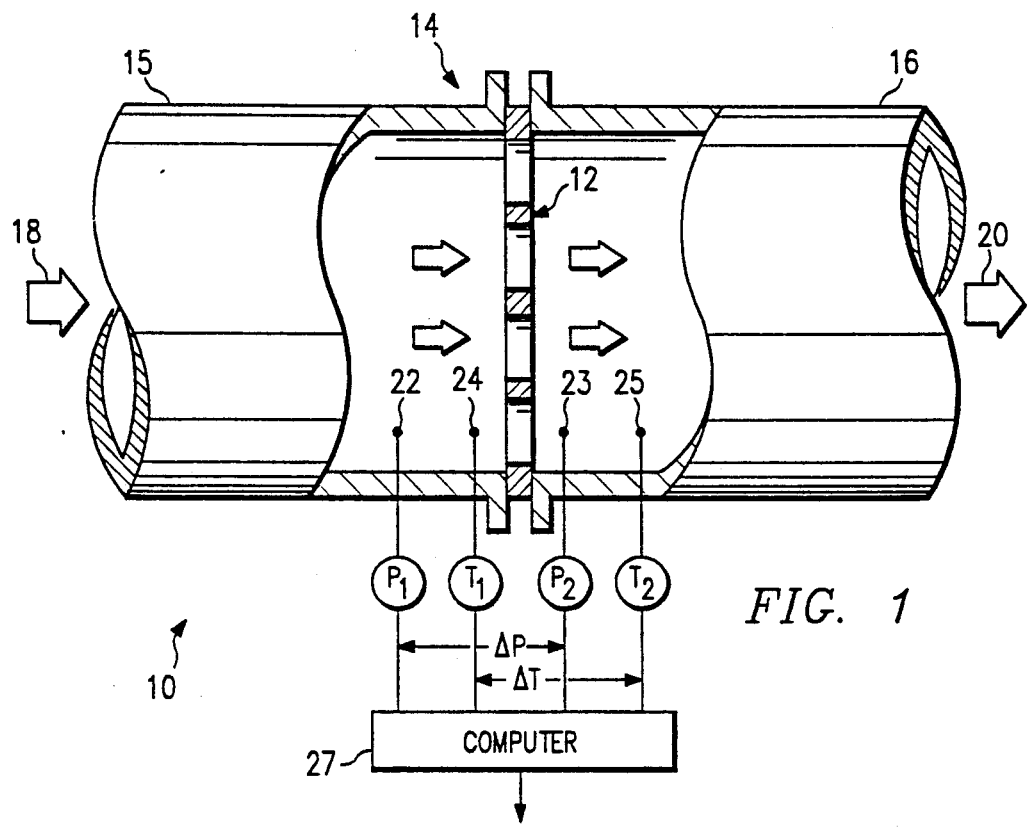
FIG. 1 is a diagrammatic view of a flowmeter using a slotted orifice constructed in accordance with the present invention.

With reference to the drawings, FIG. 1 illustrates a flowmeter 10 using a slotted orifice 12 constructed according to the teaching of the present invention. Flowmeter 10 includes a conduit section 14, which may consist only of the slotted orifice, having the same inner cavity diameter as the conduit or pipe 15 and 16 carrying a flowing fluid. Flowmeter 10 is applicable to either compressible or incompressible fluid, and generally homogeneous or non-homogeneous fluid applications. The direction of the flow is indicated by arrows 18 and 20 upstream and downstream of flowmeter 10, respectively.

Portions of conduit sections 15 and 16 are shown in cross-section to illustrate the relative positioning of slotted orifice 12 with respect to pressure sensors 22 and 23 and temperature sensors 24 and 25. Slotted orifice 12 is installed generally transversely so that the plane of slotted orifice 12 is generally perpendicular to the fluid flow. In this manner, the fluid is forced to flow through the plurality of openings in slotted orifice 12, thus creating a pressure and temperature differential across slotted orifice 12. The plurality of openings in slotted orifice 12 are shown more clearly in FIG. 2 and are described in more detail below. The pressure and temperature measurements obtained by sensors 22-25 are then provided to a computer 27, which is programmed to compute the flow rate of the fluid from the measurements using conventional equations as known in the field of flow rate measurement.

Alternatively, slotted orifice 12 may be housed independently in a short section of conduit or between flanges of conduit sections 15 and 16 as shown. Replacing conventional flow impedance devices merely constitutes dropping the slotted orifice 12 into place and securing it therein, without having to replace pressure and temperature sensors 22-25. It is also important to note that certain known equations for computing the flow rate do not require a knowledge of the temperature differential across the flow impedance device, and therefore do not require temperature sensor 24. This does not prevent the advantageous use of slotted orifice 12, as it may be used in any flowmeter that uses a flow impedance device to create a pressure differential to compute either a mass or volume flow rate.

Figure 2:
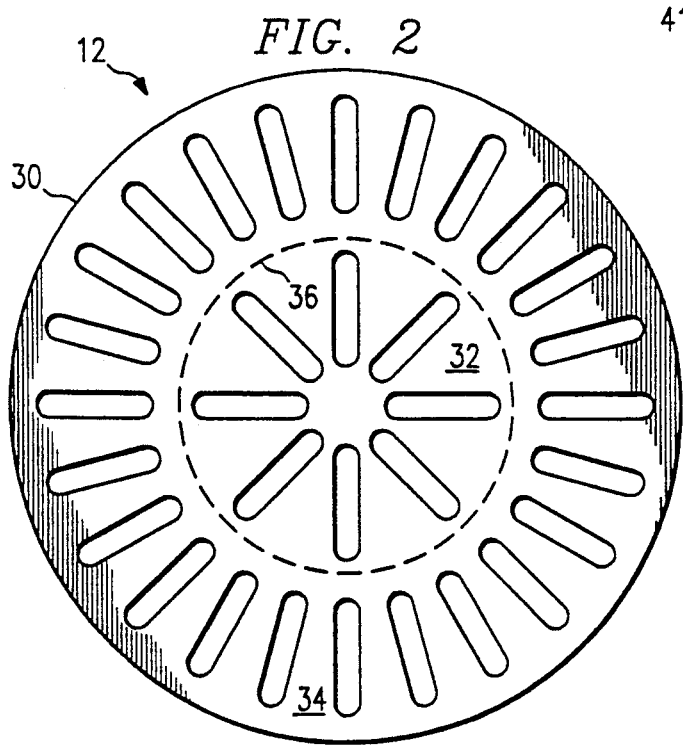
FIG. 2 is a frontal view of the slotted orifice having one possible slot geometry and arrangement.

Referring to FIG. 2, a preferred geometry of slotted orifice 12 is shown. Slotted orifice 12 is embodied in a circular plate 30, the thickness of which may vary depending upon conduit diameter and upstream flow conditions. For example, plate thickness may vary between $\frac{1}{8}$" to $\frac{3}{8}$" for a 2" diameter conduit. Circular plate 30 is preferably constructed of rigid and non-corrosive materials that are commonly used for this purpose in conventional flow impedance devices.

Circular plate 30 comprises a plurality of slots or elongated openings arranged in a predetermined pattern and geometry. Conceptually, circular plate 30 may be divided into an inner circle 32 and an outer ring 34, where the radius of inner circle 32 is one half of the radius of circular plate 30. Circular plate 30 is therefore divided into two sections where dashed line 36 indicates the division line. From simple geometry, the area of inner circle 32 is then one-third of the area of outer ring 34. As shown in FIG. 2, inner circle 32 encompasses eight slots and outer ring 34 has 24 identical size and geometry slots, realizing a one to three ratio. In other words, the total area of the slot openings in inner circle 32 is one-third that of the slot openings in outer ring 34, so that the slot areas of each respective section are directly proportional to the surface areas of inner circle 32 and outer ring 34. In this arrangement, a substantially uniform flow field is obtained across slotted orifice 12.

The geometry described above can be expanded to other arrangements in which the area of circular plate 30 is subdivided into multiple subsections, and each subsection has the number of slots proportional to its area with respect to other subsections. For example, circular plate 30 may be divided conceptually by three concentric circles into an outermost ring, a middle ring and an inner circle, where the area of the outermost ring is five times the area of the inner circle and the area of the middle ring is three times the area of the inner circle. A possible arrangement to obtain a uniform flow field would be to provide an inner circular row of X number of slots, 3X slots in the next circular row, and 5X slots in the outermost circular row.

Furthermore, although the geometry of slotted orifice 12 is shown for a conduit having a circular cross-section, it is contemplated that the slot geometry and arrangement pattern may be modified accordingly to conform with the shape of the conduit to achieve relatively the same effect. In addition, for certain applications the slots could be long vertical slits of equal length.

Figure 3:
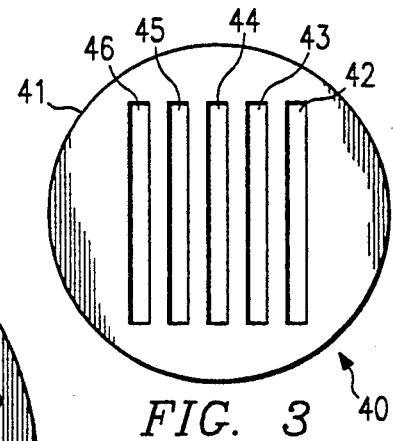
FIG. 3 is a frontal view of an alternate embodiment of the slotted orifice.

Referring to FIG. 3, an alternate embodiment 40 of the slotted orifice is shown. Slotted orifice 40 comprises a circular plate 41 having a series of slots 42-46. Slots 42-46 are vertical rectangular openings of equal width and length generally arranged in a row. Slotted orifice 40 is suited to certain applications such as flow rate measurement of non-homogenous fluids.

As shown in FIG. 2, the preferred shape of the slots in circular plate 30 is rectangular with semi-circular ends, although other similar shapes are contemplated. For example, the slots may be rectangular with square ends, or generally oblong in shape as long as all slots have substantially the same properties. For example, all slots should pass fluid at generally the same rate and cause substantially the same pressure drop. Additionally, the hydraulic diameter of all slots should be equal. The hydraulic diameter is a numeric figure indicative of the characteristic length of flow for an opening, and is equal to four times the area of the opening divided by the wetted perimeter of the opening. Therefore, the hydraulic diameter for the slots shown can be expressed as:

$$HD = \frac{w(4l + \pi w)}{2l + \pi w} \quad (1)$$

where HD is the hydraulic diameter, and w and l are the width and length of the slots, respectively. Optimally, the slot shape is long and narrow, thus making the optimal HD equal 2w.

The performance equation of slotted orifice 12 of the preferred embodiment of the present invention may be expressed by:

$$V = \frac{C_D}{\sqrt{1 - \beta^4}} A_{slots} \sqrt{\frac{2\Delta P}{\rho}} \quad (2)$$

where $$\beta = \sqrt{\frac{A_{slots}}{A_{pipe}}} \quad (3)$$

and V is the volumetric flow rate, $C_D$ is the discharge coefficient, $A_{slots}$ is the combined area of the slots, $A_{pipe}$ is the cross-sectional area of the pipe or conduit, $\rho$ is the fluid density, and $\Delta P$ is the pressure differential across slotted orifice 12. The performance equation may be written in terms of the mass flow rate:

$$m = \frac{C_D}{\sqrt{1 - \beta^4}} A_{slots} \sqrt{2\rho\Delta P} \quad (4)$$

where m is the mass flow rate.

Although the present invention has been described in detail, it should be understood that various changes, substitutions and alterations can be made thereto without departing from the spirit and scope of the present invention as defined by the appended claims.

What is claimed is:

1. In a flowmeter for determining the flow rate of a fluid in a conduit having a cross-sectional geometry and area, the flowmeter having means for measuring the pressure and temperature of the fluid as well as the pressure differential across apparatus for modifying fluid flow, and further means for computing a flow rate from the measured pressures, the apparatus for modifying fluid flow comprising:

a plate having the same geometry and substantially the same area as the cross-sectional geometry and area of the conduit, the plate defining a plurality of elongated openings, the plate being installed generally transversely in the conduit and thereby forcing the fluid flow through the plurality of elongated openings, wherein a first series of the elongated openings are positioned in an inner circle and a second series of the elongated openings are positioned in a ring concentric to the inner circle, wherein a first ratio of the combined area of the first series of elongated openings to the area of the inner circle is substantially the same as a second ratio of the combined area of the second series of elongated openings to the area of the ring.

2. The flowmeter, as set forth in claim 1, wherein the combined area of the second series of the elongated openings in the ring is substantially greater than that of the first series of the elongated openings in the inner circle.

3. The flowmeter, as set forth in claim 1, wherein the ratio between the number of the second series of the elongated openings in the ring and the number of the first series of the elongated openings in the inner circle is substantially equal to the ratio between the area of the ring and the area of the inner circle.

4. The flowmeter, as set forth in claim 1, wherein the ratio between the combined areas of the first and second series of the elongated openings is substantially the same as the ratio between the areas of the inner circle and the ring.

5. The flowmeter, as set forth in claim 1, wherein the first and second series of the elongated openings are distributed substantially uniformly within the inner circle and the ring respectively.

6. The flowmeter, as set forth in claim 1, wherein the plate defines a pattern of uniformly distributed elongated openings for achieving a uniform flow field.

7. The flowmeter, as set forth in claim 1, wherein the elongated openings comprise oblong slots.

8. The flowmeter, as set forth in claim 1, wherein the elongated openings comprise rectangular slots.

9. The flowmeter, as set forth in claim 1, wherein the elongated openings comprise narrow rectangular slots with rounded ends.

10. In a flowmeter for determining the flow rate of a compressible or incompressible non-homogeneous or homogeneous fluid in a conduit having a circular cross-section and area, the flowmeter having means for measuring the pressure of the fluid on both the upstream and downstream sides of a flow impedance device, and further means for computing a flow rate from the measured pressures, the flow impedance device comprising:

a circular plate having at least the same area as the outside cross-sectional area of the conduit, the circular plate having a plurality of elongated passageways, the circular plate being installed generally transversely in the conduit and thereby forcing the fluid flow through the plurality of passageways in a uniform manner, wherein a first set of the passageways is arranged in an inner circle and a second set of the passageways is arranged in a first ring concentric to the inner circle, wherein a ratio between the combined area of the first set to the area of the inner circle is substantially equal to a ratio of the combined area of the second set to the area of the first ring.

11. The flowmeter of claim 10, wherein a third set of the passageways in the plate is arranged in a second ring concentric to the first ring and a ratio between the combined area of the third set to the area of the second ring is substantially equal to the ratio of the combined area of the second set to the area of the first ring.

12. The flowmeter, as set forth in claim 10, wherein the combined area of the second set of the passageways is substantially greater than that of the first set of the passageways.

13. The flowmeter, as set forth in claim 10, wherein a ratio between the number of the first set of passageways and that of the second set of the passageways is substantially equal to a ratio between the combined area of the first set of the passageways and the combined area of the second set of the passageways.

14. The flowmeter, as set forth in claim 11, wherein a ratio between the combined areas of the first and second sets of the passageways is substantially equal to a respective ratio between the areas of the inner circle and the first ring.

15. The flowmeter, as set forth in claim 10, wherein the first and second sets of the passageways are uniformly distributed within the inner circle and the first ring respectively.

16. The flowmeter, as set forth in claim 10, wherein the first and second sets of the passageways are uniformly distributed within the inner circle and the first ring for achieving a uniform flow field.

17. The flowmeter, as set forth in claim 10, wherein the passageways comprise oblong slots.

18. The flowmeter, as set forth in claim 10, wherein the passageways comprise rectangular slots.

19. The flowmeter, as set forth in claim 10, wherein the passageways comprise narrow rectangular slots with rounded ends.

20. In a flowmeter for determining the flow rate of an homogeneous or non-homogeneous fluid in a conduit having a circular cross-sectional and area, the flowmeter having means for measuring the pressure of the fluid on both the upstream and downstream sides of a flow impedance device, and further means for computing a flow rate from the measured pressures, the flow impedance device comprising:

a circular plate having at least the same area as the cross-sectional area of the conduit, the circular plate having a plurality of narrow passageways, a first series of the passageways located in an inner circle, a second series of the passageways located in a ring concentric to the inner circle, a ratio of the combined area of the first series to the area of the inner circle substantially equal to the combined area of the second series to the area of the ring, the circular plate being installed generally transversely in the conduit and thereby forcing the fluid flow through the plurality of narrow passageways in a uniformly distributed manner and creating a pressure differential across the upstream and downstream sides of the circular plate, each of the plurality of passageways having a fixed area, the area of each passageway being substantially the same throughout the thickness of the plate.

21. A method for measuring the flow rate of a fluid in a conduit, comprising the steps of:
   creating a flow impedance in the conduit by forcing the fluid to flow through a plurality of narrow openings defined by a plate, a first set of the openings distributed within an inner circle, a second set of the openings distributed within a ring concentric to the inner circle, wherein a ratio of the combined area of the first set to the area of the inner circle is substantially the same as a ratio of the combined area of the second set to the area of the ring;
   measuring the pressure and temperature of the fluid;
   measuring the pressure differential of the fluid across the flow impedance; and
   computing the flow rate from the measurements.

22. The method, as set forth in claim 21, wherein the flow impedance creating step further comprises the steps of:
   providing the plate having the same geometry and at least the same area as the conduit outside cross-section; and
   forming the plurality of narrow openings in the plate such that the combined area of the second set of the openings in the ring is substantially greater than the combined area of the first set of the openings in the inner circle.

23. The method, as set forth in claim 22, wherein the narrow opening forming step further comprises the step of forming the first and second sets of the narrow openings in the inner circle and the ring respectively, the ratio between the combined area of the first set of the narrow openings in the inner circle as compared with the combined area of the second set of the narrow openings in the ring being substantially equal to the respective ratio between the areas of the inner circle and the ring.

24. The method, as set forth in claim 22, wherein the narrow opening forming step further comprises the step of forming the first and second sets of the narrow openings in the inner circle and the ring respectively, the ratio of the number of the first set of the narrow openings in the inner circle as compared with the number of the second set of the narrow openings in the ring being substantially equal to the ratio of the areas of the inner circle and the ring.

25. A flowmeter for determining the rate of a fluid flow in a conduit, the flowmeter having a flow impedance device for conditioning the fluid flow, the flow impedance device comprising a plate defining a plurality of elongated openings arranged in an inner circle and at least one ring concentric to the inner circle, the plate being installed generally transversely in the conduit and thereby forcing the fluid flow through the plurality of elongated openings, wherein a ratio of the combined area of a first set of the openings in the inner circle to the area of the inner circle is substantially equal to a ratio of the combined area of a second set of the openings in a ring to the area of the ring.

26. The flowmeter, as set forth in claim 25, wherein the conduit has a circular cross-section and the plate is circular.

27. The flowmeter, as set forth in claim 25, wherein a ratio of the combined areas of the first and second sets is substantially equal to a respective ratio of the areas of the inner circle and the ring.

28. The flowmeter, as set forth in claim 25, wherein the combined area of the second set of the elongated openings in the ring is substantially greater than that of the first set of the elongated openings in the inner circle.

29. The flowmeter, as set forth in claim 25, wherein the first and second sets of the elongated openings are uniformly distributed within the inner circle and the ring respectively to achieve a uniform flow field.

30. The flowmeter as set forth in claim 25, wherein a ratio of the number of the first set of elongated openings to the number of the second set of elongated openings is substantially equal to a ratio of the area of the inner circle to the area of the ring.

* * * * *